US006062443A

United States Patent [19]

Smrt

[11] Patent Number: 6,062,443

[45] Date of Patent: May 16, 2000

[54] MOVABLE DEVICE FOR APPLYING A MARKING COMPOSITION FROM AN AEROSOL CONTAINER ONTO A SURFACE

[76] Inventor: Thomas J. Smrt, 9716 S. Grant Hwy., Marengo, Ill. 60152

[21] Appl. No.: 09/064,255

[22] Filed: Apr. 22, 1998

Related U.S. Application Data

[60] Provisional application No. 60/044,223, Apr. 23, 1997.

[51] Int. Cl.[7] .................................................... A01C 35/00

[52] U.S. Cl. .......................................... 222/608; 222/612

[58] Field of Search .................................. 222/608, 609, 222/611.1, 610, 612, 614; 239/172; 118/305

[56] References Cited

U.S. PATENT DOCUMENTS

| | | | |
|---|---|---|---|
| 3,700,144 | 10/1972 | Smrt . | |
| 3,796,353 | 3/1974 | Smrt . | |
| 3,977,570 | 8/1976 | Smrt . | |
| 4,262,821 | 4/1981 | Smrt . | |
| 4,396,153 | 8/1983 | Smrt . | |
| 4,641,780 | 2/1987 | Smrt . | |
| 4,895,304 | 1/1990 | Smrt . | |
| 4,943,008 | 7/1990 | Smrt . | |
| 4,946,104 | 8/1990 | Smrt . | |
| 5,148,988 | 9/1992 | Smrt . | |
| 5,287,998 | 2/1994 | Smrt . | |
| 5,368,202 | 11/1994 | Smrt . | |
| 5,411,184 | 5/1995 | Smrt . | |
| 5,518,148 | 5/1996 | Smrt . | |
| 5,709,321 | 1/1998 | Smrt . | |
| 5,785,214 | 7/1998 | Smrt | 222/609 |

*Primary Examiner*—Gregory L. Huson

*Attorney, Agent, or Firm*—Leydig, Voit & Mayer, Ltd.

[57] ABSTRACT

A movable marking device including a wheeled chassis on which a plurality of aerosol container discharging mechanisms may be selectively mounted in provided. Each of the aerosol container discharging mechanisms is adapted to allow for the remote discharge of an aerosol container filled with a marking composition. Through the selective mounting of the discharging mechanisms one or more marks of one or more colors may be selectively applied to a surface during a single pass. The discharging mechanisms may be also mounted on the chassis such that a mark may be applied on a generally vertical surface adjacent to the surface over which the marking device is traversing.

22 Claims, 6 Drawing Sheets

Fig. 8.
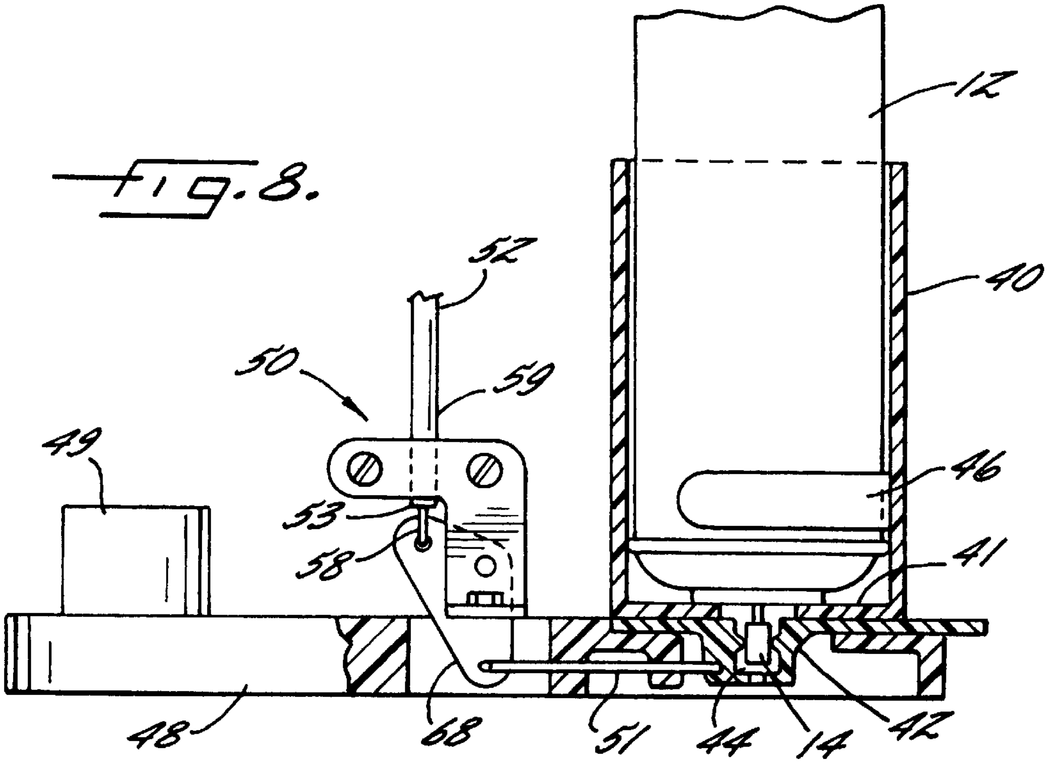
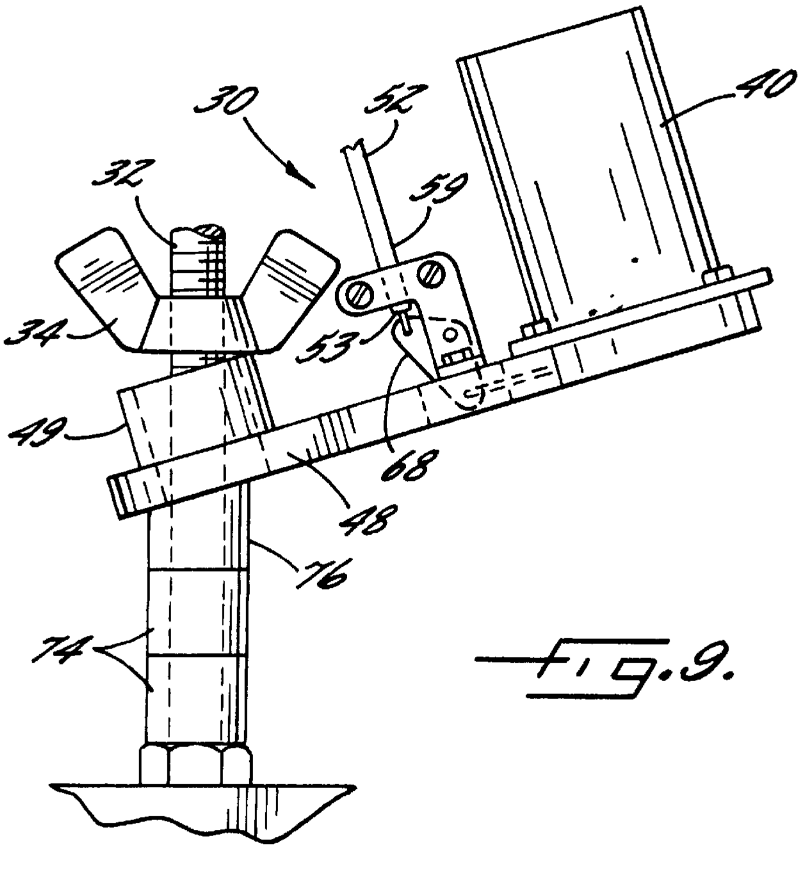
Fig. 9.

MOVABLE DEVICE FOR APPLYING A MARKING COMPOSITION FROM AN AEROSOL CONTAINER ONTO A SURFACE

This application claims priority to U.S. Provisional Application Ser. No. 60/044,223, filed Apr. 23, 1997.

FIELD OF THE INVENTION

This invention generally relates to devices for discharging the contents of aerosol containers and, more particularly, to a movable device for applying a marking composition from an aerosol container onto a surface.

BACKGROUND OF THE INVENTION

There exist a number of movable devices for applying a mark onto a surface using an aerosol container as the source of the marking composition. Examples of those devices are described in U.S. Pat. Nos. 4,262,821, 4,895,304, 4,943,008, 4,946,104, 5,148,988, 5,368,202, as well as U.S. patent application Ser. Nos. 08/298,418 and 08/622,036. In general, these devices provide for the discharge of the contents of an aerosol container onto a surface using mechanical linkages, whereby the operator of the device does not have to directly actuate the aerosol container to cause discharge of its contents. These devices have found use in a variety of marking and striping applications, e.g., striping parking lots, marking utility lines, construction site marking, ground under repair areas of golf courses, and in landscaping.

Several of the devices have wheels provided thereon, which allow the aerosol container to be discharged while being moved by an operator relative to the surface to be marked. These devices are limited, however, in that they allow only a single solid or dashed line to be applied onto the surface over which the device traverses. The provision during a single traverse of more than one line, or of one or more lines of different colors is, at best, difficult for some devices, and impossible using others. Can-swapping may enable an operator to provide a stripe of alternating colors. However, this is time consuming and will likely result in a non-linear stripe due to unintentional movement of the device. This technique would also not allow one to provide a multi-colored stripe in a single pass, nor a stripe of alternating colors (absent can-swapping). Further, none of these wheeled devices provide one with the ability to apply a mark onto a relatively vertical surface, e.g., a wall or street curb, let alone with the ability to apply a mark onto a wall and floor simultaneously.

Another issue that arises when using aerosol marking containers is the need for agitating the can prior to use. While this can be done manually (by shaking the container), applicant has developed a hands-free agitation device that can be used in conjunction with a marking device. This device is described in U.S. patent application Ser. No. 08/766,042 now U.S. Pat. No. 5,785,214. While the functionality of this device is exceptional, the use of this device requires clearance on the side of the marking device. Further, it is preferred that this agitator be positioned on each side of the marking device, and that aerosol cans of approximately the same weight be placed into both devices while the mark is being applied. If this is not done, the balance of the device may be disturbed, potentially causing a non-linear stripe to be produced.

In view of the foregoing, there exists a need for a movable marking device that allows one to selectively apply one or more marks onto a surface in a single pass, and for a device that further provides for the selective application of marks of different colors onto a surface in a single pass. A further need exists for a movable marking device that allows a relatively vertical object to be marked, while also providing the capability, if desired, of applying a mark onto a horizontal surface during that same pass. In addition, a relatively compact aerosol container agitation device that does not affect the performance of the marking device regardless of the number or relative weight of the containers that are placed therein is needed.

SUMMARY OF THE INVENTION

The present invention addresses the forgoing and other needs by providing a movable marking device that allows one to selectively apply one or more marks onto a surface in a single pass, and further provides for the selective application of marks of different colors onto a surface in a single pass. The inventive device further allows a generally vertical object to be marked, while also providing the capability, if desired, of applying a mark onto a horizontal surface during that same pass. In addition, the present invention provides a relatively compact aerosol can agitation device that does not affect the performance of the marking device regardless of the number or relative weight of the containers that are placed therein.

In one aspect of the present invention, an apparatus for discharging the contents of at least one aerosol container having an actuator which is movable between discharging and non-discharging positions onto a surface is provided. The apparatus comprises a chassis, a plurality of wheels rotatably mounted to the chassis for supporting the chassis over the surface, a handle arranged on the chassis for controlling movement of the apparatus as it moves over the surface, a plurality of mounting structures arranged on the chassis, and at least one aerosol container discharging mechanism which can be selectively mounted on any of the chassis mounting structures. The at least one aerosol container discharging mechanism comprises a structure configured to retain an aerosol container in an inverted position, an actuating assembly which effects movement of the aerosol container actuator retained in the structure between discharging and non-discharging positions, and a trigger mechanism operable to control movement of the actuating assembly and thereby an aerosol container actuator between discharging and non-discharging positions.

In accordance with a further aspect of the present invention, a movable aerosol container discharging apparatus is provided which comprises a chassis, at least one pair of wheels rotatably mounted to the chassis by an axle such that the wheels and axle rotate when the apparatus is moved relative to the surface, and at least one aerosol container discharging mechanism mounted on the chassis. The aerosol container discharging apparatus comprises a structure configured to retain an aerosol container in an inverted position, an actuating assembly which effects movement of an actuator of an aerosol container retained in the structure actuator between the discharging and non-discharging positions, and a trigger mechanism operable to control movement of the actuating assembly and thereby an aerosol container actuator between the discharging and non-discharging positions. The apparatus further including a follower member rotatably mounted to the chassis in substantially parallel relation to the axle such that an aerosol container can be supported by and between the follower member and the axle for effecting rotation of said aerosol container.

These and other features and advantages of the invention will be more readily apparent upon reading the following description of a preferred exemplary embodiment of the invention and upon reference to the accompanying drawings wherein:

BRIEF DESCRIPTION OF THE DRAWINGS

FIG. 8 is a side cross-sectional view of an exemplary aerosol container discharging mechanism showing a portion of the actuating assembly including a bell crank which moves the rotatable base in which the container actuator resides to one side via a rod, thereby causing the container to discharge its contents.

FIG. 9 is a partial side view of an exemplary aerosol container discharging mechanism illustrating the use of an angled spacer which causes the aerosol container discharging mechanism to be mounted in an angular position, thereby allowing a curb, wall or other non-horizontal surface to be marked.

While the invention will be described and disclosed in connection with certain preferred embodiments and procedures, applicant does not intended to limit the invention to those specific embodiments. On the contrary, applicant intends to cover all such alternative embodiments and modifications as fall within the spirit and scope of the invention.

DETAILED DESCRIPTION OF A PREFERRED EMBODIMENT

Figure 1:
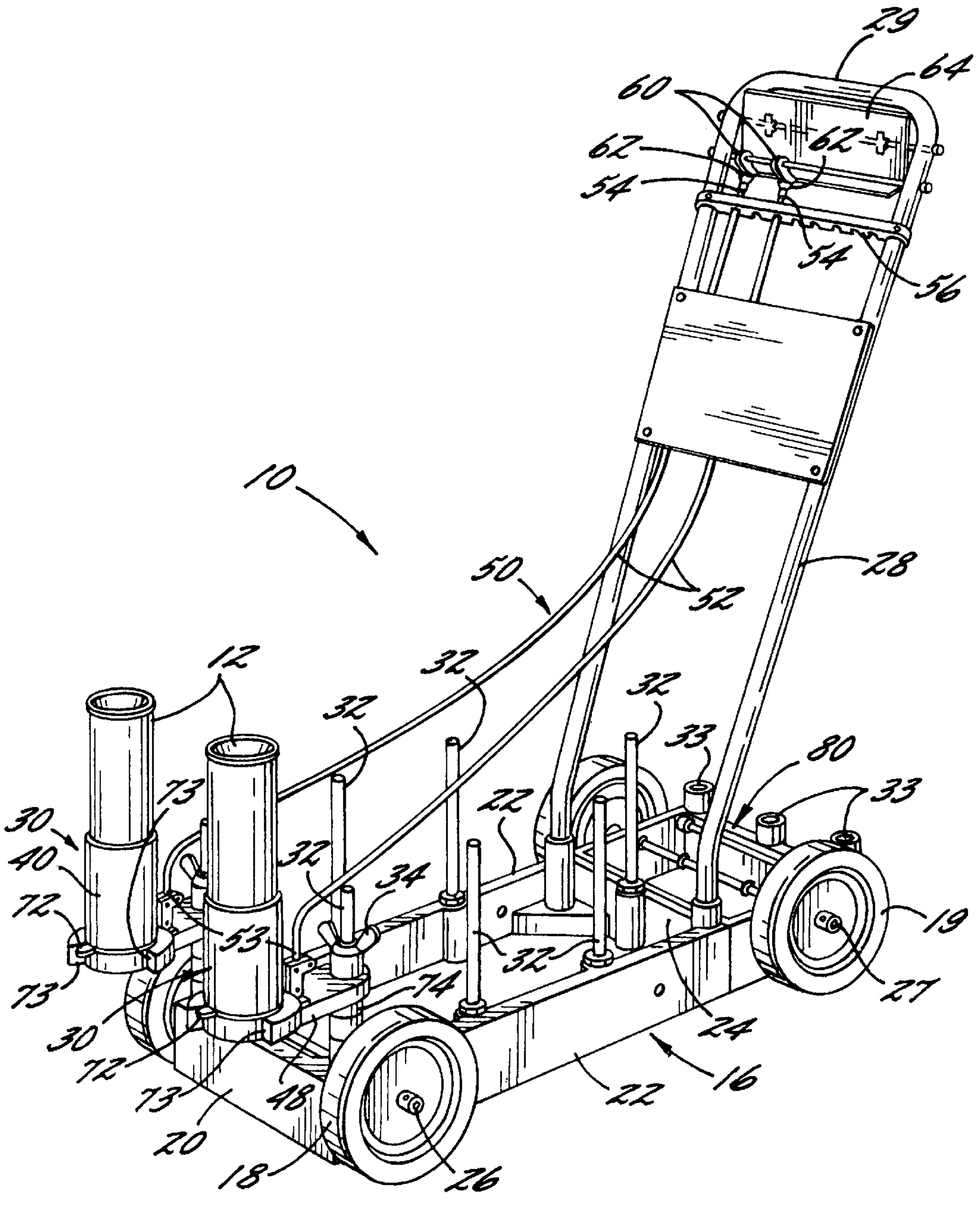
FIG. 1 is a perspective view of one embodiment of the movable marking device of the present invention having two aerosol container discharging mechanisms, including an embodiment of the optional aerosol container agitator device.

In accordance with the teachings of the present invention, a movable marking device is provided that addresses, among others, the short-comings associated with existing movable marking devices that use an aerosol container as their marking composition source. Referring more particularly to FIG. 1, there is set forth an illustrative movable marking device 10 constructed in accordance with the teachings of the present invention which allows an operator to selectively apply one or more marks onto a surface in a single pass, and further provides for the selective application of marks of different colors onto a surface in a single pass.

The marking device can be used with conventional aerosol containers 12 which are filled with a marking composition. For effecting discharge of the aerosol container contents, the aerosol container includes an actuator 14 (shown in FIG. 8) which moves between a normal non-discharging and discharging positions thereby controlling a spring-biased valve (not shown) inside the aerosol container 12. More specifically, the illustrated movable marking device 10 is intended for use with aerosol containers 12 which are discharged by angularly displacing the actuator 14 relative to a vertical arrangement which characterizes the non-discharging position. The angular displacement of the actuator 14 from the completely vertical position causes a valve inside the aerosol container to open, thereby discharging the contents of the aerosol container. Further, the valve inside the container is spring loaded such that when the force applied to angularly displace the actuator 14 is removed, the actuator returns to its former vertical (non-discharging) position closing the valve inside the container 12, thereby halting the discharge of the aerosol container contents. While the present invention is described in connection with a device which is adapted to work with aerosol containers having such an actuator, it will be readily appreciated that the present invention could be configured to work with other types of actuator and valve combinations which are well known in the art including, for example, aerosol container actuator and valve combinations that are opened when the actuator is moved longitudinally toward the container.

Figure 2:
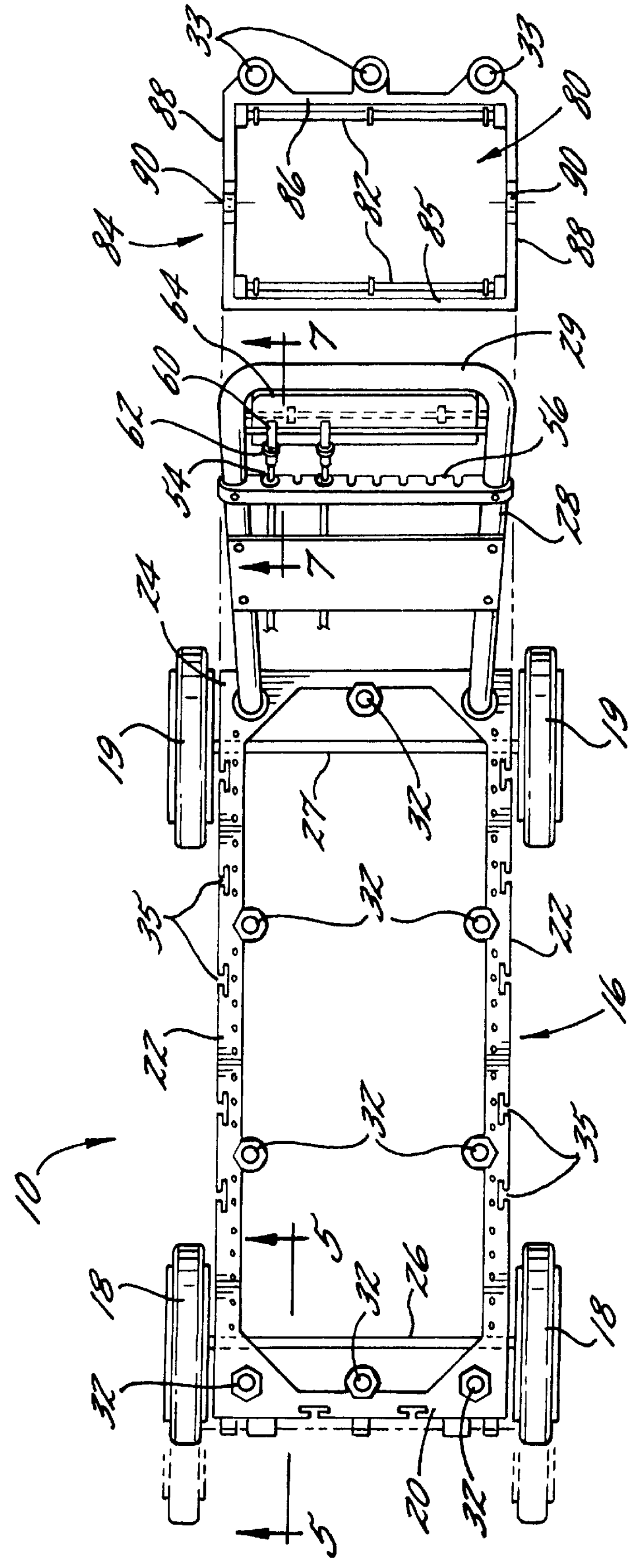
FIG. 2 is a top view of the embodiment depicted in FIG. 1 (without aerosol container discharging mechanisms), illustrating in greater detail the optional container agitator device (in exploded form) and alternate front axle position (in phantom).
Figure 3:
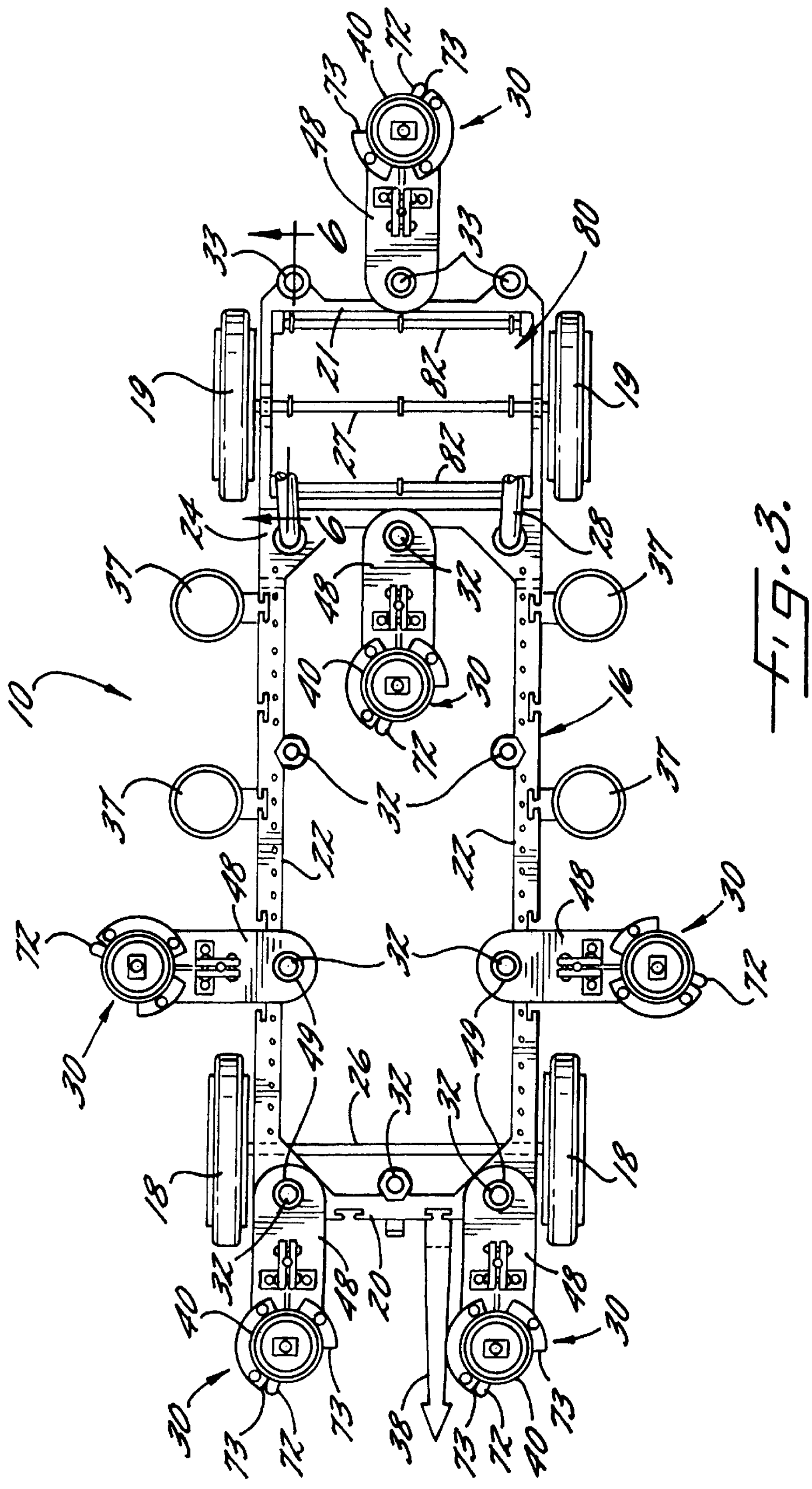
FIG. 3 is a top view of the embodiment depicted in FIG. 1, illustrating alternative positions of the individual aerosol container discharging mechanisms.
Figure 4:
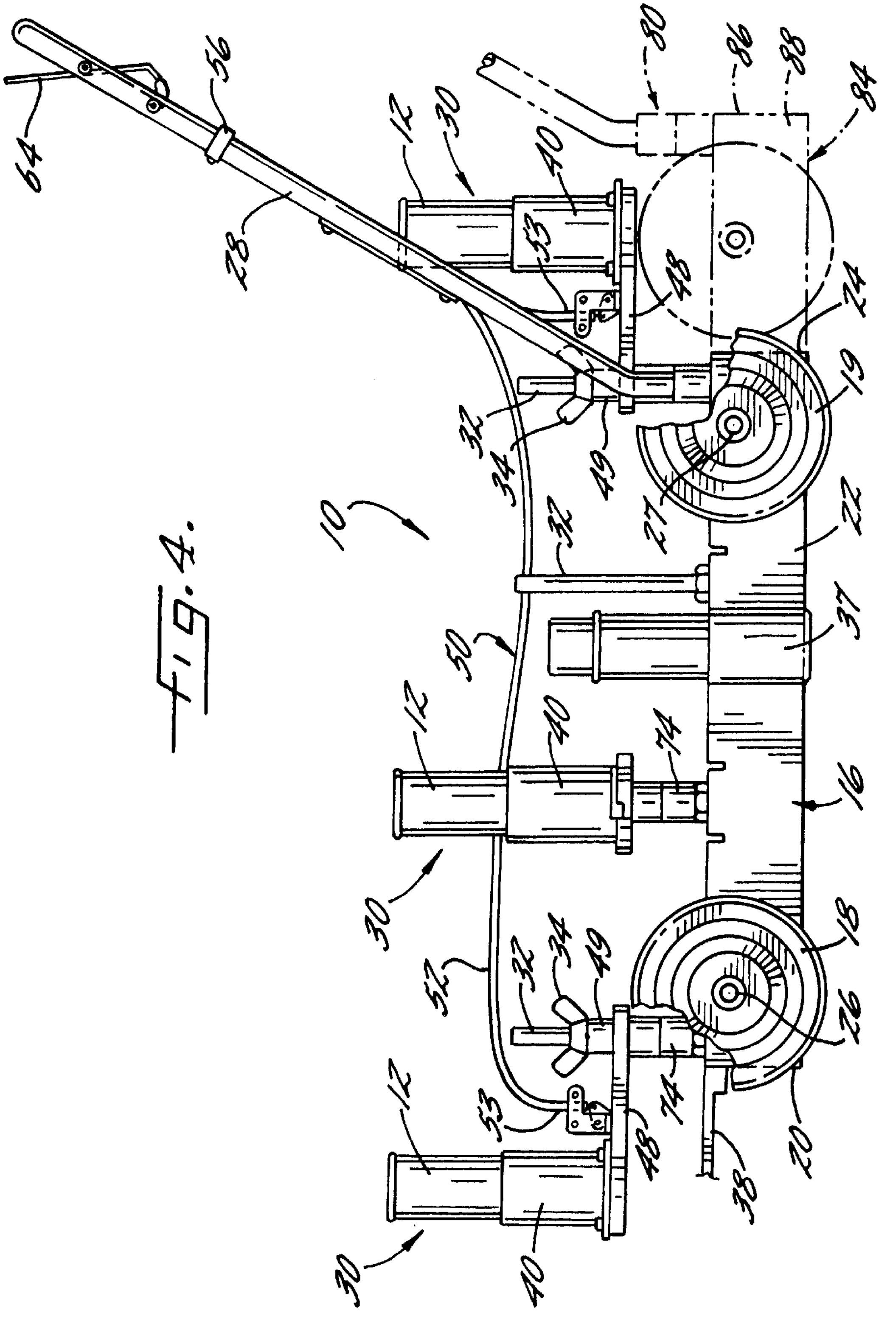
FIG. 4 is a side view of another embodiment of the inventive device, wherein the optional aerosol container agitator and alternative rear axle position are shown in phantom.

The marking device 10 generally includes a chassis 16 which is rotatably supported by a plurality of wheels 18, 19 which enable the marking device to be moved over a surface to be marked. The chassis 16 may be of any suitable shape, e.g., circular, triangular, or the like, but is preferably square or rectangular in shape. In the illustrated embodiment, the chassis 16 includes front and rear frame members 20, 21 and a pair of opposing side frame members 22 which define a generally rectangular configuration with an open center portion as best shown in FIGS. 1–3. In the illustrated embodiment, which includes an optional aerosol container agitator device, the chassis 16 further includes a cross-member 24 which extends between the side frame members 22 and provides the chassis with additional structural support and other functions which are described in detail below. Moreover, the chassis 16 includes, in this instance, a pair of front wheels 18 connected to the frame by a front axle 26, and a pair of rear wheels 19 connected to the frame by a rear axle 27. In order to enable an operator to maneuver the marking device 10 over a surface to be marked, a handle 28 is provided as shown in FIGS. 1, 2 and 4. In this embodiment, the handle 28 is mounted on the chassis 12 proximate the rear axle 27, preferably on the cross-member 24, and is configured so as to extend upwardly and rearwardly relative to the chassis such that the upper end 29 of the handle is disposed for easy manipulation by an operator. Of course, the handle 28 may be mounted in any number of locations, e.g., on any of the front, rear and side frame members, so long as it provides for manipulation of the device by an operator.

In accordance with an important aspect of the present invention, the chassis 16 of the marking device 10 is adapted to receive a plurality of aerosol container discharging mechanisms 30 which enable the marking device to be used to apply more than one mark during a single traverse over a surface. As is described in greater detail below, each of the aerosol container discharging mechanisms is configured to allow for the remote discharge of an aerosol container which is positioned close to the surface being marked (as shown in FIGS. 1, 3 and 4). These aerosol container discharging mechanisms 30 may be selectively mounted at various locations on the frame members 20, 21, 22 (and cross-member 24) which comprise the chassis 16 in order to enable an operator to create a variety of different types of marks during a single pass including marks having different colors. For example, two aerosol container discharging mechanisms 30 may be attached to the chassis 16 in spaced relation such that two parallel single stripes can be created or in side-by-side relation in order to create one double-wide stripe. Additional aerosol container discharging mechanisms 30 may be mounted on the chassis in order to create more parallel separate stripes or even wider single stripes. Moreover, aerosol containers filled with different color marking compositions may be used in the respective aerosol container discharging mechanisms in order to make multi-color marks.

To this end, and in this preferred embodiment, attached to the chassis 16 are a plurality of threaded posts 32 onto which individual aerosol container discharging mechanisms 30 can be selectively mounted. While it will be understood that these posts 32 may be located in any position about the chassis 16, in the illustrated embodiment, eight threaded posts 32 are provided. In particular, as shown in FIGS. 1 and 3, three posts 32 are provided along each of the side frame members 22 and one post is provided on both the front frame member 20 and the cross member 24. In addition, the rear frame member 21 (in this preferred embodiment) includes three additional post receiving apertures 33 within which additional posts may be optionally provided. As will be appreciated from FIG. 3, the posts 32 are arranged so as to provide a variety of different locations wherein one or more of the discharging apparatus 30 may be mounted. As best shown in FIGS. 1, 4 and 9, when the individual aerosol container discharging mechanisms 30 are mounted on respective mounting posts 32, they are secured in place by nuts 34 which are threaded onto the posts. While the present invention is described in terms of utilizing mounting posts and retaining nuts, those skilled in the art will appreciate that other methods for mounting the aerosol container discharging mechanisms 30 to the chassis 16 could also be employed, e.g., mounting slots or apertures.

Figure 5:
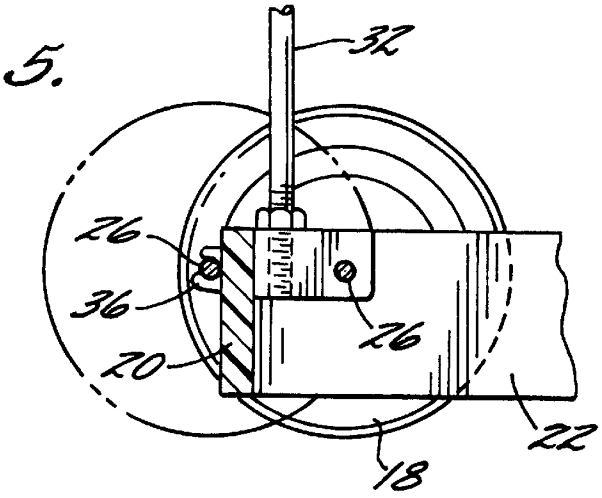
FIG. 5 is a side cross-sectional view taken in the plane of line 5—5 in FIG. 2, illustrating two alternate positions of the front axle (one alternate position shown in phantom).

To provide further flexibility with regard to the arrangement of the aerosol container discharging mechanisms 30, the front axle 26 may be attached to the chassis 16 in two alternate positions. Specifically, as shown in FIGS. 2 and 5, the front axle 26 may be selectively attached at either end to the opposing side frame members 22 (as shown in solid lines) or to the front frame member 20 via clips 36 (FIG. 5) (as shown in phantom). This feature, along with the configuration of the chassis 16, allows aerosol container discharging mechanisms 30 to be mounted on the chassis such that the containers 12 may be discharged through the open center portion of the chassis (See, e.g., FIG. 3).

In addition, as shown in FIGS. 2 and 3, a plurality of mounting slots 35 are also provided in the frame members of the chassis 16 within which container holding structures 37 may be selectively inserted in order to provide storage for spare containers, beverages or the like. Furthermore, a pointer 38 may be attached to the chassis 16 as shown in FIG. 3, in order to assist an operator in directing the movable marking device 10.

For properly positioning and retaining the aerosol containers 12 in spaced relation over the surface to be marked, each of the aerosol container actuating mechanisms 30 includes a generally cylindrical structure 40 which is sized to receive an inverted aerosol container. As shown in FIG. 8, when the aerosol container 12 is arranged in the cylindrical structure 40, the upper surface of the container engages and rests on a lower surface 41 in the cylindrical structure 40 and the aerosol container actuator 14 extends into a base member 42. The base member is mounted in depending relation from the underside of the cylindrical structure 40 and defines an opening 44 within which the container actuator 14 seats and through which the marking composition may be discharged. In order to help secure the aerosol container 12 in position, a spring clip 46 is provided in the cylindrical structure 40 which retentively and releasably engages the outer surface of the body of the container 12.

In order to enable the aerosol container discharging mechanism 30 to be mounted on one of the posts 32, a mounting flange 48 is provided which extends transversely away from the cylindrical structure. As best shown in FIG. 8, the mounting flange 48 includes an aperture 49 which is sized to fit in overlying relation on the mounting posts 32 such that the aerosol container discharging mechanism 30 may be selectively mounted on the posts 32 in any desired orientation relative to the chassis member 16. As will be appreciated, the mounting flange 48 is sized to enable the discharging mechanisms 30 to be mounted such that sufficient clearance is provided between the chassis 16 and the aerosol containers 12 being discharged as shown in FIG. 3.

For effecting movement of the aerosol container actuator 14 between the discharging and non-discharging positions, each aerosol container discharging mechanism 30 includes an actuating assembly 50 which allows for the remote discharge of an aerosol container which is retained in the cylindrical structure 40. As shown in FIG. 8, the actuating assembly includes a push rod 51 that is mounted on the mounting flange 48 for movement relative to the aerosol container 12 held in the cylindrical structure 40. In particular, the push rod 51 is arranged such that it is movable between a discharging and non-discharging position. In the discharging position, the push rod 51 engages the base member 42, which is preferably constructed of a resilient material, and pushes it to one side, thereby angularly displacing the aerosol container actuator 14 into its discharging position. In the non-discharging position, the push rod 51 retracts with respect to the base member, allowing the aerosol container actuator 14 to move into the non-discharging position.

Figure 7:
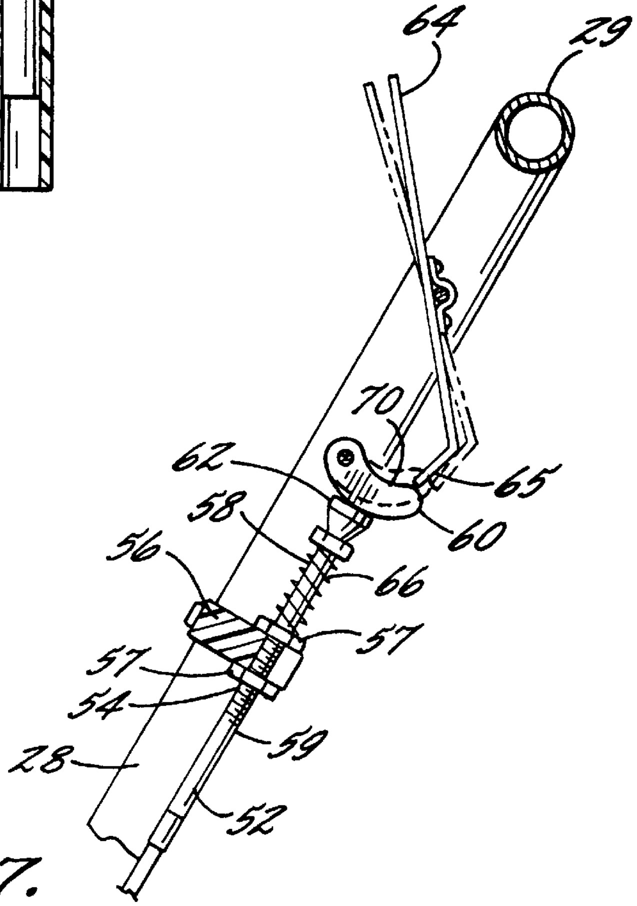
FIG. 7 is a partial side sectional view of the actuating assembly taken along the plane of line 7—7 in FIG. 2 showing a cam member arranged on the handle which is movable to provide control over the discharge of marking composition from an aerosol container, the cam member shown in the discharging and non-discharging (in phantom) positions.

For controlling movement of the push rod 51, and thereby the aerosol container actuator 14, between the discharging and non-discharging positions, the actuating assembly 50 further includes an actuating cable 52. As shown in FIGS. 1 and 4, the actuating cable 52 has a first end 53 which is attached to the mounting flange 48 and a second or upper end 54 which can be selectively mounted on the handle 28. In particular, as shown in FIGS. 2 and 7, the handle 28 includes a mounting structure 56 to which the upper end 54 of the actuating cable 52 of a plurality of aerosol container discharging mechanisms 30 may be selectively affixed by means of conventional nuts 57 (FIG. 7). In the illustrated embodiment, the actuating cable 52 comprises a trigger wire 58 which is slidably received in coaxial relation in an outer protective sheath 59 as best shown in FIGS. 7–9. Sliding movement of the triggering wires 58 of the aerosol container discharging mechanisms 30 is effected via cam members 60 which are pivotally and slidably mounted adjacent the upper end 29 of the handle 28 as shown in FIG. 7. Preferably, a cam member 60 is provided for each post 32 so that an aerosol container discharging mechanism 30 may be mounted on each of the posts 32 on the chassis 16. Each cam member 60 is adapted and arranged to engage a push knob 62 which is provided on the upper end 54 of the trigger wire 58 and thereby slide the trigger wire relative to the outer sheath 59. Specifically, a triggering lever 64 is provided which is pivotally mounted adjacent the upper end 29 of the handle 28 for movement between discharging and non-discharging positions. As shown in FIG. 7, the lower end 65 of the triggering lever 64 engages the cam member 60 such that as the triggering lever 64 is moved, in this case, toward the handle 28 from the non-discharging position (shown in phantom) to the discharging position (shown in solid lines), the lower end 65 of the triggering lever 64 pivots the cam member downwardly. The cam member 60, in turn, pushes downwardly on the push knob 62 on the trigger wire 58 counter to the bias of a spring 66 which is provided on the actuating cable 52. The downward movement of the trigger wire 58 is translated into lateral movement of the push rod 51 into the discharging position by a bell crank 68 which is rotatably supported on the mounting flange 48 of the aerosol container discharging mechanism as shown in FIG. 8. When an operator releases the triggering lever 64, the bias of the spring 66 pulls the triggering wire 58 back upwardly thereby moving the push rod 51 back into the non-discharging position via the bell crank 68.

Optimally, the cam members 60 and the triggering lever 64 are configured such that the trigger lever may be placed into a continuously discharging position. In the illustrated embodiment, the upper surface of the cam member 60 includes an indentation 70 (shown in FIG. 7) which will frictionally catch and hold the triggering lever 64 in the discharging position. It will be appreciated, however, that other mechanisms could be employed to lock the triggering lever 64 in the discharging position. In order to avoid potential interference with operation of the triggering lever 64, the cam members 60 can be simply pivoted upwards and out of the way of the triggering lever when they are not being used, or may be slid laterally so they will not be engaged by the triggering lever.

Those skilled in the art will appreciate that alternative actuating assemblies could be employed which are adapted to be used with aerosol container actuator and valve combinations that are opened when the container actuator is moved toward the container. In particular, with aerosol containers having such arrangements, the push rod of the actuating assembly should be arranged to move the aerosol container downwardly relative to the container holder such that the container actuator is displaced towards the container thereby opening the valve and discharging the contents of the container downwardly towards the surface to be marked. Moreover, an actuating assembly could be employed which can be used with more than one type of container valve and actuator combination or a single marking apparatus could have individual discharging mechanisms 30 which are equipped with actuating assemblies configured to handle different types of container actuator and valve combinations.

In order to enable the width of the mark which is applied to be selectively varied, the base member 42 is rotatably mounted to the underside of the cylindrical structure 40. The base member 42 may be selectively rotated via a lever arm 72 which is attached to the base member 42 and extends outwardly beyond the outer surface of the cylindrical container holding structure 40 as best shown in FIGS. 1 and 8. The lever arm 72 is operable between a pair of stops 73 (FIGS. 1 and 3) which are defined on the outer surface of the cylindrical structure 40, in order to enable the orientation of the base member 42 and, in turn, the container actuator 14, to be rotated up to 90° relative to the container holding structure 30. As aerosol container actuators typically have a rectangular shaped orifice through which the contents are discharged, it will be appreciated that the rotation of the actuator 14 may also be used to vary the width of the mark. A similar rotatable base structure is disclosed in U.S. Pat. No. 5,411,184.

In a further means of varying the width of the mark, one or more spacers 74 may be used which enable the aerosol container discharging mechanisms 30 to be spaced upwardly on the posts 32 relative to the chassis 16, and thereby the surface to be marked. As shown in FIG. 9, the spacers 74 have a generally annular configuration which enables them to be placed onto the posts 32 beneath the mounting flanges 48 of the discharging mechanisms 30 in order to selectively raise the discharging mechanism, and thereby the aerosol container 12, to a predetermined distance above the surface being marked. As will be appreciated through the use of spacers 74 of different thickness, the distance between the aerosol container actuator 14 and the surface to be marked may be varied over a wide range, thereby enabling marks having a wide variety of widths to be created.

In accordance with a further aspect of the present invention, the marking device 10 is readily adapted to enable a mark to be applied to a vertical or generally vertical surface, such as a curb or wall, while the marking device is traversing a horizontal surface, such as the ground or a floor. Specifically, as shown in FIG. 9, a spacer 76 having an angled upper surface may be placed over one of the posts 32 underneath the mounting flange 48 of the discharging mechanism 30. As will be appreciated, the angled spacer 76 can be used to tilt the discharging mechanism 30 upwards relative to the chassis 16 such that marking composition may be discharged onto a generally vertical surface to one side of the marking device 10, when the marking device is traversed over a horizontal surface adjacent the generally vertical surface. Alternatively, the mounting flange 48 of the discharging mechanism 30 may be hinged such that the discharging mechanism 30 may be tilted upwards relative to the chassis 16 so as to enable the actuator of an aerosol container held therein to be directed towards a vertical surface.

Figure 6:
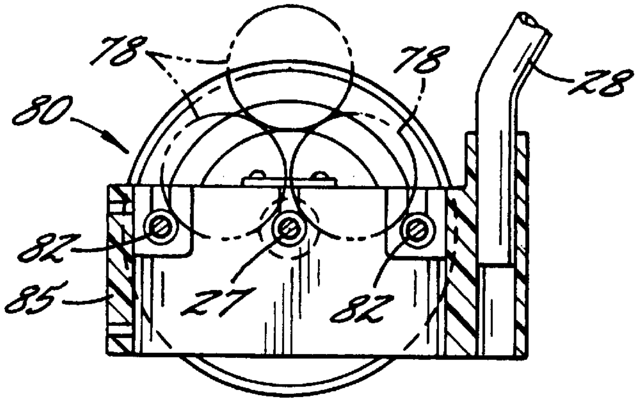
FIG. 6 is a side cross-sectional view of an aerosol container agitator taken in the plane of line 6—6 in FIG. 3, illustrating the agitator simultaneously agitating three containers (shown in phantom).

An additional aspect of the present invention lies in the provision of a mechanism which enables spare aerosol containers to be agitated while the movable marking device 10 is moved over a surface. As shown in FIGS. 1–3 and 6, an aerosol container agitator 80 can be provided on the movable marking device 10 which translates movement of the marking device 10 over a surface into agitation of one or more space containers. The agitator 80, in this case, is arranged at the rear end of the marking device 10 within the space to the rear of where the handle is mounted to the chassis, that space being defined by the cross member 24 of the frame and the rear and side frame members 21, 22. As shown in FIG. 6, the rear axle 27 and a pair of follower rods 82 divide the agitator space in such a manner that two spare aerosol containers 78 (shown in phantom) can be arranged longitudinally on top of and between the rear axle 27 and a respective one of the follower rods 82. The follower rods 82 are rotatably supported by the opposing side frame members 22 such that when the movable marking device 10 is driven over a surface, the rotation of the rear axle 27 causes the spare containers 78 to rotate and, in turn, the follower rods 82 to rotate. A third spare container 78 can be agitated by the rotation of the other two containers by arranging it on top of and between the other two containers. As will be appreciated, this rotation of the containers agitates the contents of the spare containers automatically as the movable marking device 10 is pushed over a surface, thereby eliminating the need for an operator to manually agitate the spare container prior to using it to replace one of the original discharging containers. Moreover, since the agitator 80 is disposed entirely within the confines of the chassis 16, use of the agitator 80 does not restrict maneuverability of the device.

As shown in FIGS. 2 and 4, the movable marking device 10 can be configured such the container agitator 80 can be provided as an optional accessory. In particular, in one preferred embodiment the movable marking device 10 is configured such that a frame extension piece 84 including a container agitator 80 constructed in accordance with the present invention may be selectively mounted to the rear end of the chassis 16. As best shown in FIG. 2, the frame extension piece has a rectangular configuration including front and rear frame members 85, 86 and opposing side frame members 88. Two follower rod members 82 are rotatably mounted to the opposing side frame members 88 and the side frame members also include apertures 90 which enable the rear axle 27 to be selectively mounted on the frame extension 84. The frame extension piece 84 can be mounted with the front frame member 85 of the frame extension engaging the rear of the chassis such that the rear frame member 86 of the frame extension defines the rear wall of the chassis 16 and the front frame member 85 of the frame extension becomes part of the intermediate cross frame member which extends between the side walls. As will be appreciated, including the container agitator 80 in the frame extension piece 84 provides additional flexibility for the movable marking device 10 by enabling an operator to attach and remove the container agitator as desired. However, alternatively the container agitator may be configured integral with the chassis.

All of the references cited herein, including patents, patent applications and publications are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. An apparatus for discharging the contents of at least one aerosol container having an actuator that is movable between discharging and non-discharging positions onto a surface comprising:

a chassis having an open center portion;

a plurality of wheels rotatably mounted to the chassis for supporting the chassis over the surface;

a handle arranged on the chassis for controlling movement of the apparatus as it moves over the surface;

a plurality of mounting structures arranged on the chassis, and at least one aerosol container discharging mechanism that can be selectively mounted on any of the chassis mounting structures and selectively positioned to permit an aerosol container mounted therein to discharge into either the open center portion of the chassis or outboard of the chassis, the at least one aerosol container discharging mechanism comprising:

a structure configured to retain an aerosol container in an inverted position, an actuating assembly that effects movement of the aerosol container actuator retained in the structure between discharging and non-discharging positions, and a trigger mechanism operable to control movement of the actuating assembly and thereby an aerosol container actuator container actuator between discharging and non-discharging positions.

2. The apparatus according to claim 1, wherein the apparatus includes a plurality of aerosol container discharging mechanisms which can be selectively mounted on any of the chassis mounting structures.

3. The apparatus according to claim 1, wherein the mounting structures comprise upstanding posts arranged on the chassis.

4. The apparatus according to claim 3, wherein the upstanding posts are threaded and the aerosol container discharging mechanism can be secured in position on any of the posts by a nut which is threaded on the respective post.

5. The apparatus according to claim 3, wherein the distance between the container retaining structure and the surface can be selectively adjusted by arranging one or more spacers on the respective post on which the aerosol container discharging mechanism is mounted.

6. The apparatus according to claim 5, wherein one of the one or more spacers has an angled surface such that the container retaining structure of the aerosol container discharging mechanism mounted on the respective post is angled upward relative to the surface such that the contents of an aerosol container retained in the retaining structure can be selectively discharged onto a vertical surface.

7. The apparatus according to claim 1, further comprising a base member rotatably mounted to the underside of the aerosol container retaining structure and having an opening within which an aerosol container actuator seats such that the aerosol container actuator can be selectively rotated through rotation of the base member.

8. The apparatus according to claim 7, further including an arm attached to the base member for controlling rotation of the base member.

9. The apparatus according to claim 1, wherein the actuating assembly includes a push rod which is mounted on the aerosol container retaining structure for transverse movement relative to the aerosol container held in the container retaining structure between a discharging position, wherein the push rod displaces the aerosol container actuator between the discharging position and a non-discharging position.

10. The apparatus according to claim 9, wherein movement of the push rod is controlled by an actuating cable having a first end which is attached to the container retaining structure and a second end which is selectively mountable to a cable mounting structure provided on the handle, the actuating cable including a trigger wire which is arranged for longitudinal sliding movement in an outer protective sheath.

11. The apparatus according to claim 10, wherein the longitudinal sliding movement of the trigger wire is translated into transverse movement of the push rod by a bell crank which is rotatably mounted on the container retaining structure.

12. The apparatus according to claim 10, further including a spring attached to the actuator wire such that the spring biases the trigger wire to a position wherein the push rod is in the non-discharging position.

13. The apparatus according to claim 10, wherein the trigger mechanism includes a trigger lever arm which is pivotally mounted to the handle such that when the trigger lever arm is pivoted from a non-discharging position to a discharging position the trigger lever arm engages and pivots a cam member pivotally mounted to the handle adjacent the cable mounting structure which thereby engages and slidably moves the trigger wire such that the push rod is moved into the discharging position.

14. The apparatus according to claim 13, wherein a cam member is provided for each of the respective chassis mounting structures.

15. The apparatus according to claim 14, wherein the cam members are mounted to the handle such that the individual cam members can be selectively moved into a position wherein they are not engaged by the trigger lever arm as it is pivoted between the discharging and non-discharging positions.

16. The apparatus according to claim 12, wherein the surface of the cam member is configured so as to frictionally catch and hold the triggering lever in the discharging position.

17. The apparatus according to claim 1, wherein at least one pair of wheels are mounted to the chassis by an axle such that the wheels and axle rotate when the apparatus is moved relative to the surface and the apparatus further comprising at least one follower member rotatably mounted to the chassis in substantially parallel relation to the axle such that an aerosol container can be supported by and between the follower member and the axle for effecting rotation of said aerosol container.

18. An apparatus for discharging the contents of one or more aerosol containers having an actuator which is movable between discharging and non-discharging positions onto a surface comprising:

a chassis, at least one pair of wheels rotatably mounted to the chassis by an axle such that the wheels and axle rotate when the apparatus is moved relative to the surface, at least one aerosol container discharging mechanism mounted on the chassis, the aerosol container discharging apparatus comprising:

a structure configured to retain an aerosol container in an inverted position, an actuating assembly which effects movement of an actuator of an aerosol container retained in the structure actuator between the discharging and non-discharging positions, and a trigger mechanism operable to control movement of the actuating assembly and thereby an aerosol container actuator between the discharging and non-discharging positions, and a follower member rotatably mounted to the chassis in substantially parallel relation to the axle such that an aerosol container can be supported by and between the follower member and the axle for effecting rotation of said aerosol container.

19. The apparatus according to claim 18, further comprising a second follower member rotatably mounted to the chassis in substantially parallel relation to the axle such that an aerosol container can be supported by and between the second follower member and the axle for effecting rotation of said aerosol container.

20. The apparatus according to claim 19, wherein the first and second follower members are mounted on the chassis such that a third aerosol container may be supported on and between the aerosol containers supported by and between the first follower member and the axle and the second follower member and the axle for effecting rotation of the third aerosol container.

21. The apparatus according to claim 18, wherein the axle is arranged at a rear end of the chassis.

22. The apparatus according to claim 18, wherein the follower member and the axle are rotatable supported on a frame extension piece which can be selectively connected to the chassis.

* * * * *